(12) United States Patent
Ahn

(10) Patent No.: US 9,656,623 B2
(45) Date of Patent: May 23, 2017

(54) CRASH BOX OF VEHICLE HAVING INTEGRATED JOINT STRUCTURE BY SPOT WELDING AND ASSEMBLY METHOD THEREOF

(71) Applicant: Hyundai Motor Company, Seoul (KR)

(72) Inventor: Do-Hwan Ahn, Hwaseong-si (KR)

(73) Assignee: Hyundai Motor Corporation, Seoul (KR)

( * ) Notice: Subject to any disclaimer, the term of this patent is extended or adjusted under 35 U.S.C. 154(b) by 2 days.

(21) Appl. No.: 14/871,573

(22) Filed: Sep. 30, 2015

(65) Prior Publication Data

US 2016/0144814 A1 May 26, 2016

(30) Foreign Application Priority Data

Nov. 20, 2014 (KR) ........................ 10-2014-0162247

(51) Int. Cl.
| | |
|---|---|
| B60R 19/34 | (2006.01) |
| B60R 19/02 | (2006.01) |
| B23K 31/02 | (2006.01) |
| B23K 9/16 | (2006.01) |
| B23K 11/11 | (2006.01) |
| B23K 33/00 | (2006.01) |
| B23K 101/00 | (2006.01) |
| B23K 101/28 | (2006.01) |

(52) U.S. Cl.
CPC ................ B60R 19/34 (2013.01); B23K 9/16 (2013.01); B23K 11/11 (2013.01); B23K 31/022 (2013.01); B23K 33/008 (2013.01); B60R 19/023 (2013.01); *B23K 2201/006* (2013.01); *B23K 2201/28* (2013.01)

(58) Field of Classification Search
CPC .... B62D 21/152; B62D 25/082; B62D 25/08; B62D 21/15; B62D 25/085; B62D 25/088; B62D 25/14; B60R 19/34; B60R 19/18; B60R 2019/247; B60R 19/03; B60R 19/023; B60R 19/24; B60R 2019/1813
USPC ....... 293/133, 132, 120, 154, 122, 115, 124; 296/187.09, 187.1, 187.05, 193.02, 205, 296/70
See application file for complete search history.

(56) References Cited

U.S. PATENT DOCUMENTS

| | | | |
|---|---|---|---|
| 6,554,176 B2 * | 4/2003 | McGill | B23K 15/0006 228/112.1 |
| 6,648,385 B2 * | 11/2003 | Frank | B60R 19/34 293/120 |
| 2008/0224487 A1 | 9/2008 | Wang et al. | |

(Continued)

FOREIGN PATENT DOCUMENTS

| | | |
|---|---|---|
| JP | 2007-030725 A | 2/2007 |
| JP | 2011-111036 A | 6/2011 |

(Continued)

*Primary Examiner* — Glenn Dayoan
*Assistant Examiner* — Sunsurraye Westbrook
(74) *Attorney, Agent, or Firm* — McDermott Will & Emery LLP

(57) ABSTRACT

A crash box of a vehicle includes a back-beam laterally mounted to a front side of the vehicle. A first panel is longitudinally mounted to a rear side of the back-beam and combined with the back-beam. A second panel is longitudinally mounted to the rear side of the back-beam, is combined with the back-beam, and faces the first panel.

8 Claims, 3 Drawing Sheets

(56) References Cited

U.S. PATENT DOCUMENTS

| | | | |
|---|---|---|---|
| 2013/0241220 A1* | 9/2013 | Grall | B60R 19/34 293/133 |
| 2013/0300138 A1* | 11/2013 | Banasiak | B60R 19/34 293/133 |
| 2014/0284948 A1* | 9/2014 | Hoschouer | B60R 19/34 293/133 |
| 2014/0346790 A1* | 11/2014 | Kale | B60R 19/18 293/133 |

FOREIGN PATENT DOCUMENTS

| | | |
|---|---|---|
| JP | 2011-526856 A | 10/2011 |
| KR | 10-2010-0024763 A | 3/2010 |
| KR | 10-2013-0070358 A | 6/2013 |
| WO | 02/04253 A1 | 1/2002 |

\* cited by examiner

-- RELATED ART --

-- RELATED ART --

CRASH BOX OF VEHICLE HAVING INTEGRATED JOINT STRUCTURE BY SPOT WELDING AND ASSEMBLY METHOD THEREOF

CROSS-REFERENCE TO RELATED APPLICATIONS

This application claims the benefit of priority under 35 U.S.C. §119 to Korean Patent Application No. 10-2014-162247, filed on Nov. 20, 2014, in the Korean Intellectual Property Office, the disclosure of which is incorporated herein by reference in its entirety.

TECHNICAL FIELD

The present disclosure relates to a crash box of a vehicle and an assembly method thereof, and more particularly, to a crash box of a vehicle having integrated joint structure by spot welding, and a method of assembling the crash box.

BACKGROUND

A vehicle has a bumper at a front side of the vehicle for protecting a car body from external shock. The bumper includes a back-beam made of a metal having a predetermined level of rigidity, an energy absorber made of urethane to absorb shock and mounted on a front side of the back-beam, and a bumper cover covering the back-beam and the energy absorber.

Various bumpers are manufactured for vehicles to efficiently absorb shock energy in order to minimize injury to passengers and damage to main parts of the vehicles.

In general, the back-beam is coupled to front side members (also called "stays") at both side of a front end module (FEM) having a radiator at a center through a crash box.

FIG. 1A is a perspective view illustrating an assembly of a back-beam and a crash box of the related art, and FIG. 1B is an exploded perspective view illustrating the crash box of a vehicle of the related art.

As illustrated in FIG. 1A, a crash box 2 of the related art is fixed by welding to the rear of a back-beam laterally disposed on a front side of a vehicle and absorbs shock energy of the vehicle.

In detail, as illustrated in FIG. 1B, the crash box 2 has a U-shape by pressing and includes an inner panel 2a and an outer panel 2b bonded by spot welding. The inner and outer panels 2a and 2b and the back-beam 1 are coupled by a bracket 3, and the inner and outer panels 2a and 2b and front side members (not illustrated) are coupled by a plate 4.

The crash box 2, the bracket 3, and the plate 4 are usually combined by butt welding using $CO_2$, and in the figures, welding joints (indicated by straight lines) are formed between the crash box 2 and the bracket 3 and between the crash box 2 and the plate 4.

That is, the crash box of the related art is assembled by coupling the inner panel 2a and the outer panel 2b to the bracket 3 on the rear of the back-beam 1 using $CO_2$ welding. The inner panel 2a and the outer panel 2b are combined using spot welding. The plate 4 is coupled to a rear side of the inner panel 2a and the outer panel 2b using $CO_2$ welding.

However, in the crash box of the related art, the joints of the crash box, that is, the $CO_2$-welded portions crack and break during the shock ability and durability test.

When the crash box breaks, shock energy is instantaneously cut and a car body cannot sufficiently absorb the shock energy, so the vehicle may further damaged and passengers may further injured.

Although it is possible to increase strength by double-welding the joints of the crash box in order to prevent such separation, it increases the manufacturing cost and decreases productivity.

SUMMARY

The present disclosure has been made in an effort to provide a crash box of a vehicle that is improved in welding quality by integrally forming a panel, a bracket, and a plate and applying spot welding only, and a method of assembling the crash box.

The present disclosure has also been made in an effort to provide a crash box of a vehicle that is improved against problems with shock ability and durability due to crack or break at welding portions and can be manufactured at a low cost and for a short period of time with a relatively small number of parts.

The technical subject to implement in the present disclosure are not limited to the technical problems described above and other technical subjects that are not stated herein will be clearly understood by those skilled in the art from the following specifications.

According to an exemplary embodiment of the present inventive concept, a crash box of a vehicle includes a back-beam laterally mounted to a front side of a vehicle. A first panel is longitudinally mounted to a rear side of the back-beam and combined with the back-beam. A second panel is longitudinally disposed on the rear side of the back-beam, combined with the back-beam, and coupled to face the first panel. A side of the first panel and a side of the second panel are overlapped and bonded each other.

The first panel may have a first bracket extending forward from the first panel and brought in surface contact with the rear side of the back-beam. A first plate vertically extends from a rear side of the first panel. The first panel, the first bracket, and the first plate are integrally formed.

The second panel may have a second bracket extending forward from the second panel and brought in surface contact with the rear side of the back-beam. A second plate vertically extends from a rear side of the second panel. The second panel, the second bracket, and second first plate are integrally formed.

In the crash box, the first panel and the second panel may be bonded by spot welding, and the first panel may be larger than the second panel and completely cover an outer side of the second panel.

According to another exemplary embodiment of the present inventive concept, a method of manufacturing a crash box of a vehicle includes arranging a first panel and a second panel to face each other and overlapping a side of the first panel and a side of the second panel. The first panel and the second panel are combined by bonding the overlapped portion of the first panel and the second panel. The combined first panel and second panel are coupled to a rear side of a back-beam.

The first panel may have a first bracket integrally extending from a front side of the first panel and a first plate integrally extending from a rear side of the first panel. The second panel may have a second bracket integrally extending from a front side of the second panel and a second plate integrally extending from a rear side of the second panel.

The first panel and the second panel may be combined by spot welding.

According to the exemplary embodiments of the present inventive concept, since a panel, a bracket, and a plate are integrally formed, without a joint of a crash box, that is, a joint between a panel and a bracket and a joint between the panel and a plate that are used in the related art, it is possible to prevent breaking of the joint due to a vehicle collision.

Since integral parts having a panel, a bracket, and a plate are bonded only by spot welding without $CO_2$ welding used for a crash box in the related art, it is possible to improve welding quality.

Unlike a crash box of the related art having four parts of an inner panel, an outer panel, a bracket, and a plate, the crash box of the present disclosure is composed of only two integral parts, thus reducing cost, the number of processes, and a period of time for manufacturing a vehicle.

It is also possible to improve safety against a collision of a vehicle and commercial value of the vehicle by removing shock ability and durability problems due to crack or break at welded portions of a crash box.

DETAILED DESCRIPTION OF THE EMBODIMENTS

Figure 1A:
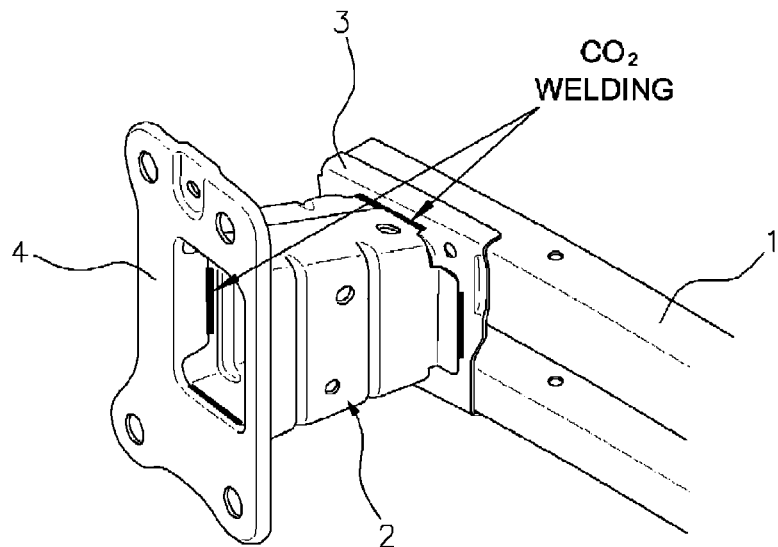
FIG. 1A is a perspective view illustrating an assembly of a back-beam and a crash box of the related art.

Hereinafter, exemplary embodiment of the present inventive concept will be described in detail with reference to the accompanying drawings for those skilled in the art to be able to easily accomplish the present invention. However, the present disclosure may be achieved in various different ways and is not limited to the embodiments described herein.

In the accompanying drawings, portions not related to the description will be omitted in order to clearly describe the present disclosure, and like reference numerals will be used to describe like components throughout the specification.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the terms to describe most appropriately the best method he or she knows for carrying out the invention.

Figure 2:
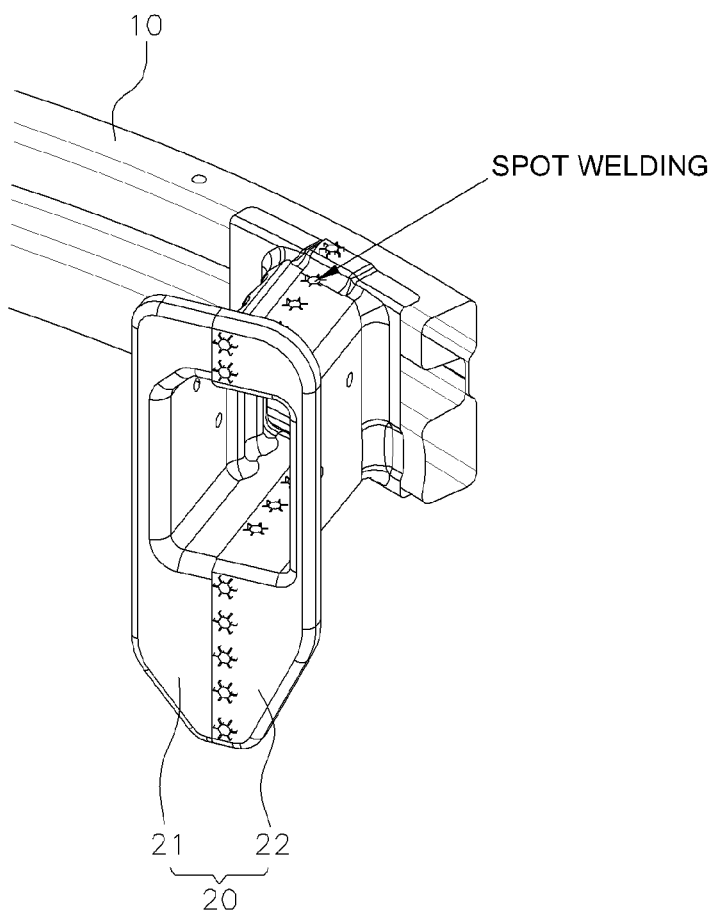
FIG. 2 is a perspective view illustrating a crash box of a vehicle according to an embodiment of the present inventive concept.
Figure 3:
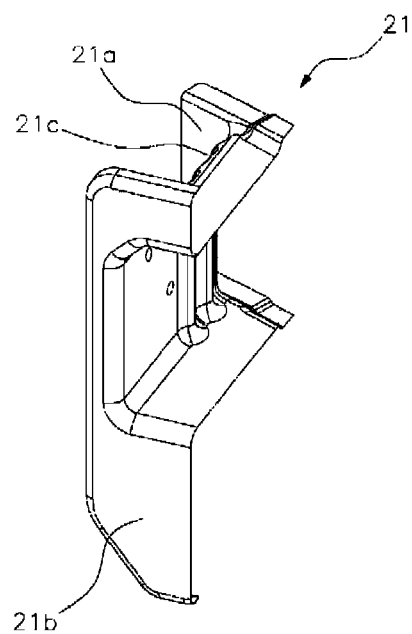
FIG. 3 is a perspective view illustrating a first panel according to an embodiment of the present inventive concept.
Figure 4:
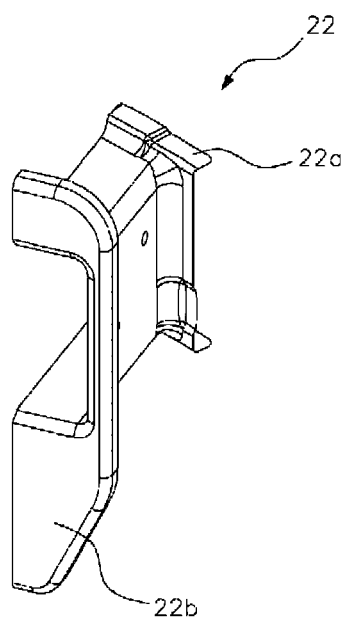
FIG. 4 is a perspective view illustrating a second panel according to an embodiment of the present inventive concept.

FIG. 2 is a perspective view illustrating a crash box of a vehicle according to an embodiment of the present inventive concept, FIG. 3 is a perspective view illustrating a first panel according to an embodiment of the present inventive concept, and FIG. 4 is a perspective view illustrating a second panel according to an embodiment of the present inventive concept.

As illustrated in FIGS. 2 to 4, a crash box 20 of a vehicle according to an embodiment of the present inventive concept includes a back-beam 10 laterally mounted to a front side of the vehicle. A first panel 21 is longitudinally mounted on a rear side of the back-beam 10 and combined with the back-beam 10. A second panel 22 is longitudinally mounted on the rear side of the back-beam 10, combined with the back-beam, and faces the first panel 21.

In general, the back-beam 10 is made of a metal to have a predetermined level of rigidity and coupled to front side members (not illustrated) at both sides of a front end module (FEM) through the crash box 20.

As illustrated in FIG. 1A, the crash box 2 of the related art is coupled to the rear side of the back-beam 1 through the bracket 3 bonded by $CO_2$ welding, but the crash box 20 according to the present disclosure is directly coupled to the rear side of the back-beam 10.

In detail, the crash box 20 includes the first panel 21 and the second panel 22 in which a side (the right side in the figures) of the first panel 21 and a side (the left side in the figures) of the second panel 22 overlap each other.

Figure 1B:
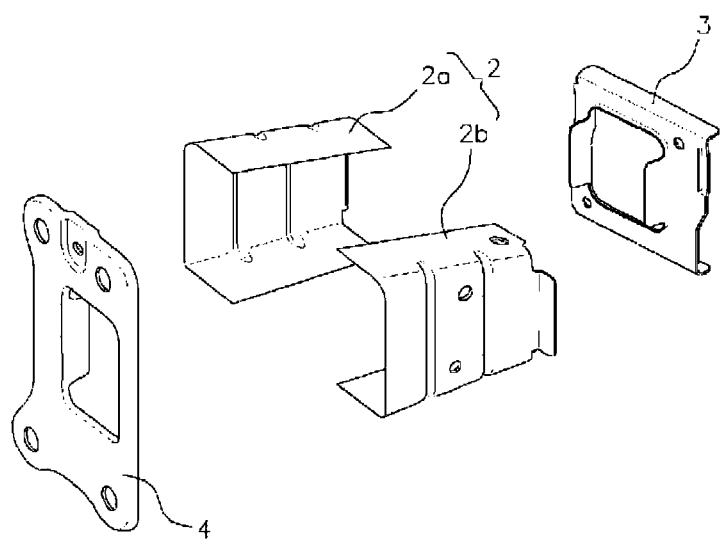
FIG. 1B is an exploded perspective view illustrating the crash box of a vehicle of the related art.

That is, the first panel 21 and the second panel 22 according to the present disclosure are overlapped to face each other and bonded, and then fastened to the rear side of the back-beam 10. Here, the first panel 21 and the second panel 22 are directly coupled to the back-beam without an additional bracket (FIG. 1B) or plate (FIG. 1B) used in the related art.

The first panel 21 and the second panel 22 are bonded only by spot welding (indicated by points in FIG. 2) and $CO_2$ welding used in the related art is not used.

As illustrated in FIG. 3, the first panel 21 may have a first bracket 21a integrally extending forward from the first panel 21 to be in surface contact with the rear side of the back-beam 10, and a first plate 21b integrally vertically extending from the rear side of the first panel 21.

That is, the first panel 21 according to the present disclosure has the first bracket 21a directly coupled to the rear side of the back-beam 10 and the first plate 21b directly coupled to a front side member (not illustrated).

In detail, the first panel 21 is bent in a U-shape entirely and has a plurality of bending portions 21c on a side thereof to cope with a collision of the vehicle.

The first bracket 21a, which integrally extends forward of the first panel 21, has a predetermined inclination to fit to the shape of the back-beam 10, and the first plate 21b integrally extends on the rear of the first panel 21.

As illustrated in FIG. 4, the second panel 22 may have a second bracket 22a integrally extending forward from the second panel 22 to be in surface contact with the rear of the back-beam 10 and a second plate 22b integrally vertically extending from the rear of the second panel 22.

The second panel 22 is almost symmetric to the first panel 21, but has no bending 21c on a side and is smaller than the first panel 21.

The second panel 22 is directly coupled to the rear side of the back-beam 10 by the second bracket 22a and directly coupled to a front side of a front side member (not illustrated) by the second plate 22b.

As illustrated in FIG. 2, the first panel 21 is larger than the second panel 22 and a portion (the left surface in the figure) of an outer side of the second panel 22 is completely covered with the first panel 21.

A method of assembling the crash box according to the present disclosure is as follows.

First, the first panel 21 and the second panel 22 face each other and a side (the right side in the figures) of the first panel 21 and a side (the left side in the figures) of the second panel 22 are overlapped each other.

The crash box 20 is formed by bonding the overlapping first panel 21 and second panel 22, and the combined first and second panel 21 and 22 are directly coupled to a rear side of the back-beam 10.

The combination of the first panel 21 and the second panel 22 and the combination of the bonded first and second panels 21 and 22 and the back-beam 10 may be both made by spot welding, and accordingly, $CO_2$ welding may not be used in the present disclosure.

As described above, the first panel 21 may have the first bracket 21a integrally extending from the front side of the first panel 21 and the first plate 21b integrally extending from the rear side of the first panel 21. The second panel 22 may have the second bracket 22a integrally extending from the front side of the second panel 22 and the second plate 22b integrally extending from the rear side of the second panel 22.

The crash box 20 according to the present disclosure is achieved by bonding two integral parts, using only spot welding without $CO_2$ welding, such that the problem of breaking at joints is prevented.

It will be apparent to those skilled in the art that the foregoing present disclosure is not limited by the foregoing embodiments and the accompanying drawings, and various modifications and changes may be made without departing from the scope and spirit of the invention.

What is claimed is:

1. A crash box of a vehicle, comprising:
    a back-beam laterally mounted to a front side of the vehicle;
    a first panel longitudinally mounted to a rear side of the back-beam and combined with the back-beam; and
    a second panel longitudinally, which is combined with the back-beam and coupled to face the first panel, mounted to the rear side of the back-beam,
    wherein the first panel has one side overlapping with and bonded to one side of the second panel, and
    wherein the first panel has a larger surface area than that of the second panel to completely cover one surface of the second panel.

2. The crash box of claim 1, wherein the first panel includes:
    a first bracket extending forward from the first panel to be in surface contact with the rear side of the back-beam; and
    a first plate vertically extending from a rear side of the first panel,
    wherein the first panel, the first bracket, and the first plate are integrally combined.

3. The crash box of claim 1, wherein the second panel includes:
    a second bracket extending forward from the second panel to be in surface contact with the rear side of the back-beam; and
    a second plate vertically extending from a rear side of the second panel,
    wherein the second panel, the second bracket, and second plate are integrally combined.

4. The crash box of claim 1, wherein the first panel and the second panel are bonded by spot welding.

5. The method of claim 1, wherein the first panel is bent in a U-shape and has a plurality of bending portions on a side thereof.

6. A method of manufacturing a crash box of a vehicle, comprising:
    arranging a first panel and a second panel to face each other and overlapping a side of the first panel with a side of the second panel;
    combining the first panel and the second panel by bonding the overlapped portion of the first panel and the second panel; and
    coupling the combined first panel and second panel to a rear side of a back-beam,
    wherein the first panel has a larger surface area than that of the second panel to completely cover one surface of the second panel.

7. The method of claim 6, wherein the first panel has a first bracket integrally extending from a front side of the first panel and a first plate integrally extending from a rear side of the first panel, and
    the second panel has a second bracket integrally extending from a front side of the second panel and a second plate integrally extending from a rear side of the second panel.

8. The method of claim 6, wherein the step of combining the first panel and the second panel is made by spot welding.

* * * * *